United States Patent
Kang et al.

(10) Patent No.: US 11,833,103 B2
(45) Date of Patent: Dec. 5, 2023

(54) HIP JOINT LINK APPARATUS

(71) Applicant: Seoul National University R&DB Foundation, Seoul (KR)

(72) Inventors: Seok Won Kang, Seoul (KR); Yoon Young Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 250 days.

(21) Appl. No.: 17/154,086

(22) Filed: Jan. 21, 2021

(65) Prior Publication Data

US 2021/0386610 A1 Dec. 16, 2021

(30) Foreign Application Priority Data

Jun. 12, 2020 (KR) .................. 10-2020-0071805
Oct. 20, 2020 (KR) .................. 10-2020-0136264

(51) Int. Cl.
*A61H 3/00* (2006.01)

(52) U.S. Cl.
CPC ......... *A61H 3/00* (2013.01); *A61H 2003/007* (2013.01); *A61H 2201/163* (2013.01); *A61H 2201/1652* (2013.01); *A61H 2201/1676* (2013.01)

(58) Field of Classification Search
CPC ............... A61H 3/00; A61H 2003/007; A61H 2201/163; A61H 2201/1652; A61H 2201/1676
See application file for complete search history.

(56) References Cited

U.S. PATENT DOCUMENTS

| 5,020,790 | A | 6/1991 | Beard et al. |
| 2006/0213305 | A1* | 9/2006 | Sugar .................. F16H 21/44 74/490.01 |
| 2014/0330431 | A1* | 11/2014 | Hollander ............... A61H 3/00 29/428 |
| 2015/0134080 | A1* | 5/2015 | Roh .................... B25J 9/1694 623/32 |
| 2015/0321340 | A1 | 11/2015 | Smith |
| 2019/0232485 | A1 | 8/2019 | Reese |
| 2019/0240524 | A1* | 8/2019 | Nasiri ................. A61H 1/0244 |

(Continued)

FOREIGN PATENT DOCUMENTS

| CN | 106333830 | 1/2017 |
| CN | 110251365 | 9/2019 |
| CN | 110666783 | 1/2020 |

(Continued)

*Primary Examiner* — Jerrah Edwards
*Assistant Examiner* — Aren Patel
(74) *Attorney, Agent, or Firm* — LEX IP MEISTER, PLLC

(57) ABSTRACT

An embodiment of the present invention provides a hip joint link apparatus including: an upper body link fixed to an upper body of a wearable robot, and a hip joint jointer linking a thigh link linked to a thigh of the wearable robot, wherein the hip joint jointer has a four-revolute joint structure including a plurality of revolute joints and a plurality of links; an arbitrary input moment to the hip joint jointer is changed to an output moment in a predetermined direction based on a state of being transmitted to the plurality of links through the plurality of revolute joints; and the hip joint jointer assists a flexion moment, an extension moment, an abduction moment, and an adduction moment.

7 Claims, 9 Drawing Sheets

(56) References Cited

U.S. PATENT DOCUMENTS

2020/0238542 A1* 7/2020 Castro .................... B25J 9/0006

FOREIGN PATENT DOCUMENTS

| KR | 10-2018-0068805 | 6/2018 |
|----|----------------|---------|
| KR | 10-1948261 | 2/2019 |
| KR | 10-2016859 | 8/2019 |
| KR | 10-2032500 | 11/2019 |
| KR | 10-2213377 | 2/2021 |
| WO | 2017-167349 | 10/2017 |
| WO | 2019-076417 | 4/2019 |

* cited by examiner

FIG. 6
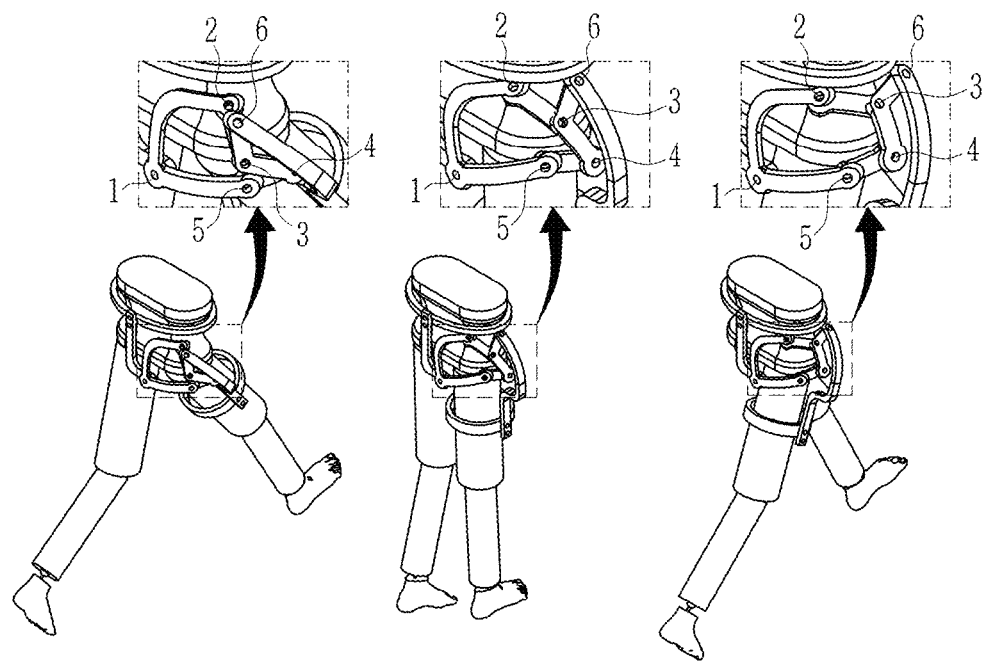
1) Initial contact ~ Loading response    2) Mid stance    3) Terminal stance~Pre swing
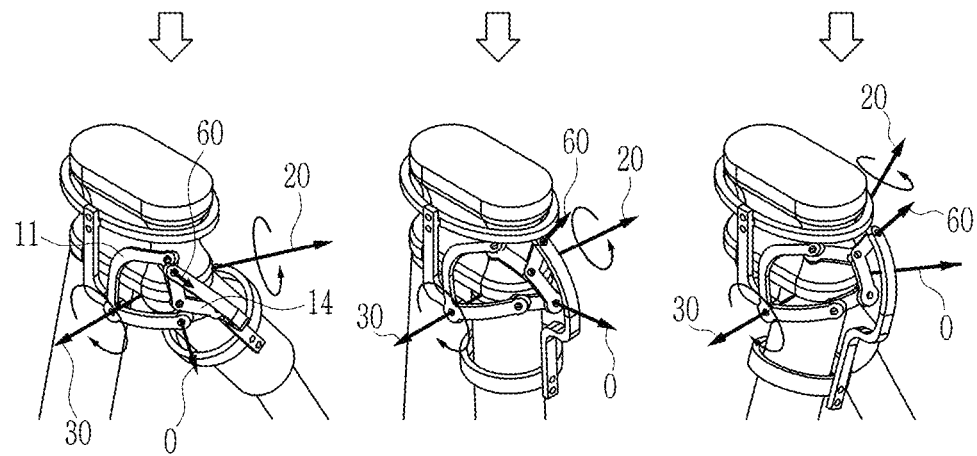
1) Initial contact ~ Loading response    2) Mid stance    3) Terminal stance~Pre swing

HIP JOINT LINK APPARATUS

CROSS-REFERENCE TO RELATED APPLICATION

This application claims priority to and the benefit of Korean Patent Application No. 10-2020-0071805 filed in the Korean Intellectual Property Office on Jun. 12, 2020, and Korean Patent Application No. 10-2020-0136264 filed in the Korean Intellectual Property Office on Oct. 20, 2020, the entire contents of which are incorporated herein by reference.

BACKGROUND OF THE INVENTION

(a) Field of the Invention

A hip joint link apparatus is provided.

(b) Description of the Related Art

Generally, a hip joint is an important part that allows a body to move forward while balancing an upper body when walking. Recently, it has been proven that gait ability of a user is improved when appropriate hip joint moment assistance is applied to a user wearing a wearable robot.

The moment of the hip joint applied to the human body is largely divided into the moments of flexion and extension, and abduction and adduction, and the direction of the required moment is changed depending on gait phases.

In most existing robots worn on hip joints, one actuator per leg assists flexion moment and extension moment, or two actuators per leg assist flexion moment and extension moment, and abduction moment and adduction moment.

Accordingly, there is a need for development of robots worn on a hip joint that may assist all the moments that are changed while walking while using fewer actuators.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a hip joint link apparatus of a wearable robot that may assist torques of which direction is varying between flexion/extension and abduction/adduction depending on gait phases when a user wearing a wearable robot walks even if only one actuator per leg is used.

An embodiment of the present invention provides a hip joint link apparatus including: an upper body link fixed to an upper body of a wearable robot, and a hip joint jointer linking a thigh link to a thigh of the wearable robot, wherein the hip joint jointer includes a four-bar linkage structure including a plurality of revolute joints and a plurality of links; an arbitrary input moment to the hip joint jointer is changed to an output moment in a predetermined direction based on a state of being transmitted to the plurality of links through the plurality of revolute joints; and the hip joint jointer assists a flexion moment, an extension moment, an abduction moment, and an adduction moment.

The plurality of revolute joints may include: a first revolute joint that is linked to the upper body link and functions as a rotation axis of an input moment, a second revolute joint that is interlocked at one side thereof to rotation of the first revolute joint, a third revolute joint that is interlocked to rotation of the second revolute joint, a fourth revolute joint that is interlocked to rotation of the third revolute joint, a fifth revolute joint that is provided at a position spaced apart from the second revolute joint by a predetermined distance and is interlocked at the other side thereof to rotation of the first revolute joint, and a sixth revolute joint that is linked to the thigh link and is interlocked to rotation of the third revolute joint.

The plurality of links may include: a first link linked to the upper body link through the first revolute joint, a second link linked to the first link through the second revolute joint, a third link linked to the first link through the fifth revolute joint, and a fourth link linked to the second link through the third revolute joint and linked to the third link through the fourth revolute joint.

The thigh link may be linked to the fourth link through the sixth revolute joint.

The first link may include an eleventh coupling part that is linked to a lower portion of the upper body link to have a pivotable central support structure, a twelfth coupling part wherein an end portion thereof that is bent from the eleventh coupling part in a predetermined direction to extend is linked to one side of the second link, and a thirteenth coupling part wherein an end portion thereof that is spaced apart from the twelfth coupling part from the eleventh coupling part by a predetermined distance to extend in a direction of the third link is linked to one side of the third link.

The fourth link may include a forty-first coupling part that has a pivotable central support structure and is linked to the other side of the second link, a forty-second coupling part wherein an end portion thereof extending in a predetermined direction from the forty-first coupling part is linked to an upper portion of the thigh link, and a forty-third coupling part wherein an end portion thereof that is spaced apart from the forty-second coupling part from the forty-first coupling part by a predetermined distance to extend in a direction of the third link is linked to the other of the third link.

The hip joint link apparatus may further include at least one driving part, wherein the driving part may be linked to the first revolute joint.

Since a joint part of a hip joint linking an upper body link fixed to an upper body of the wearable robot and a thigh link coupled to a thigh has a four-revolute joint mechanism including a plurality of revolute joints and a plurality of links, and may change input moment of an actuator into an output moment in a desired direction, the hip joint link apparatus according to the embodiment may assist flexion, extension, abduction, and adduction moments required when a user wearing the wearable robot walks.

BRIEF DESCRIPTION OF THE DRAWINGS

FIG. 6 illustrates a walking situation after a user wears a prototype of a hip joint link apparatus according to an embodiment of the present invention.

DETAILED DESCRIPTION OF THE EMBODIMENTS

The technical terms used herein are to simply mention a particular embodiment and are not meant to limit the present invention. The terminologies used herein are just to illustrate a specific exemplary embodiment, but are not intended to limit the present invention. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other specific features, regions, numbers, operations, elements, components, and/or groups may exist or may be added.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
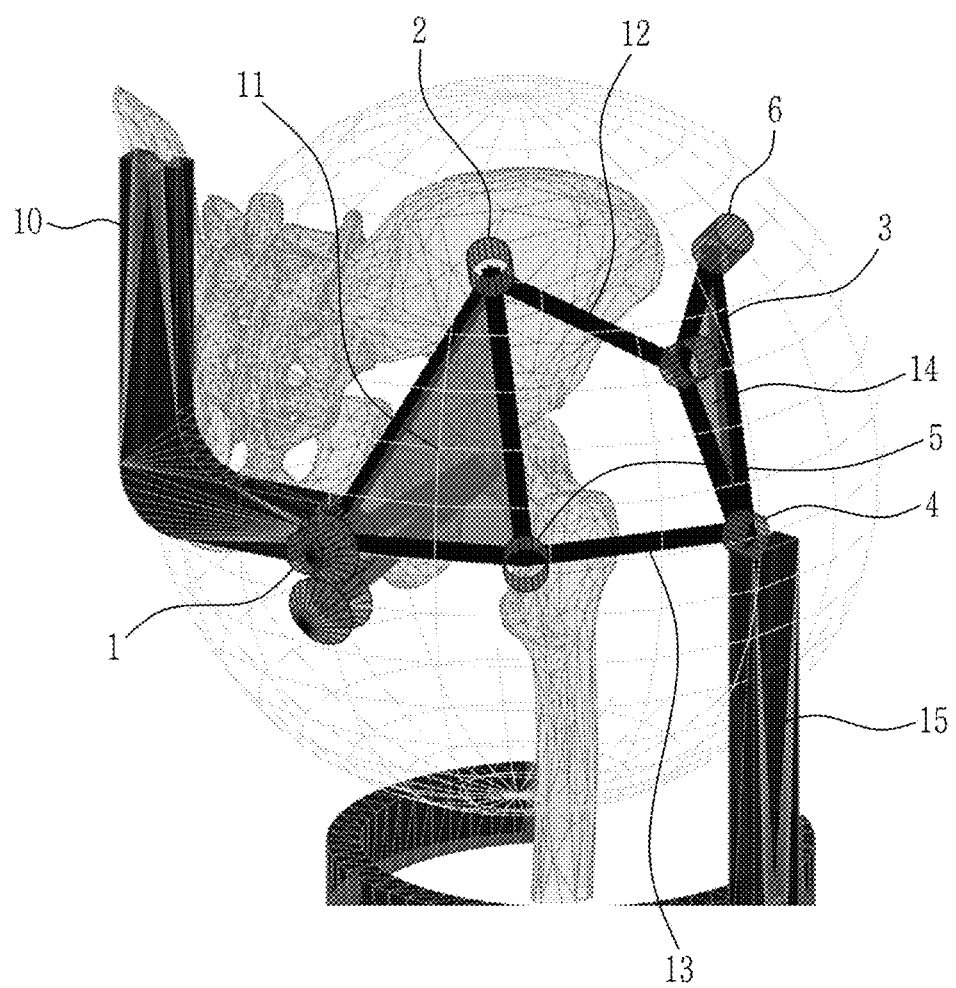
FIG. 1 illustrates a schematic view of a hip joint link apparatus according to an embodiment of the present invention.
Figure 2:
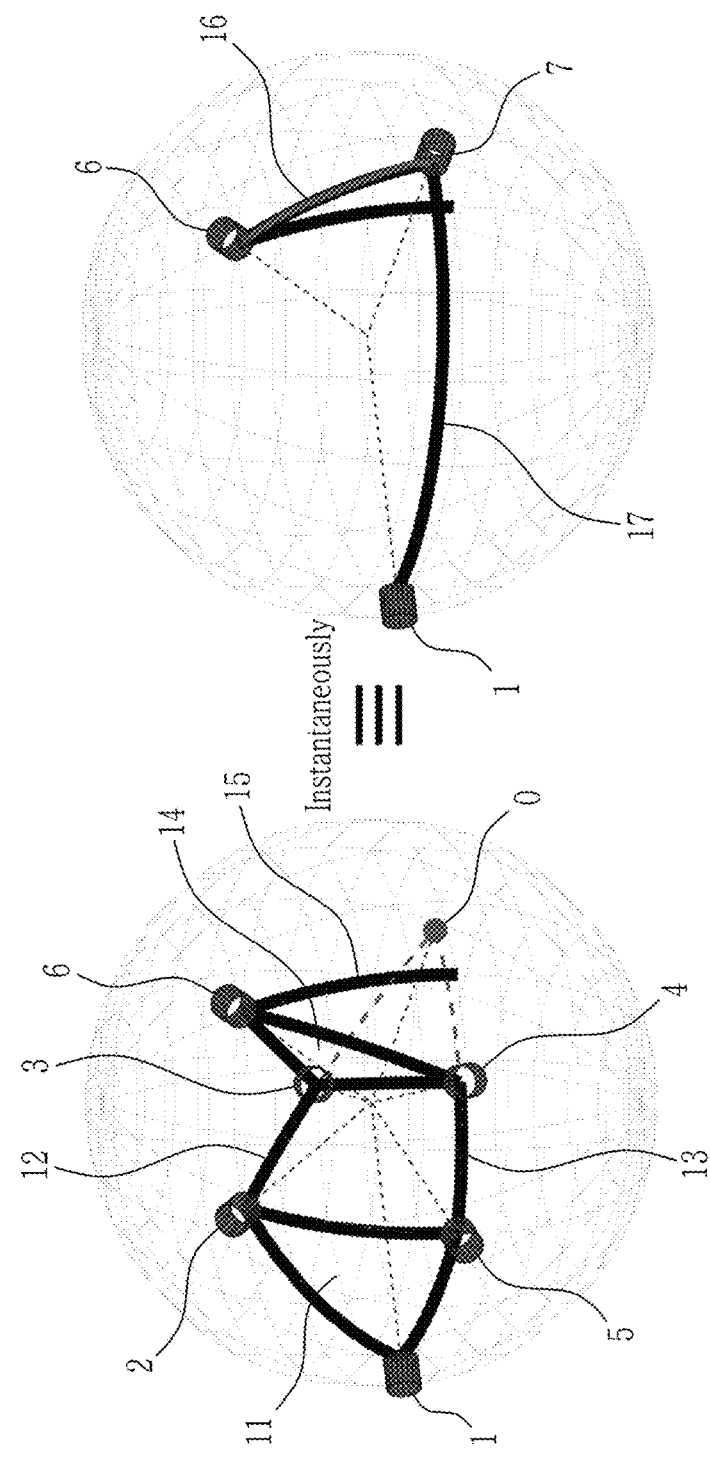
FIG. 2 illustrates the same series link mechanism instantaneously in terms of a force transmission relationship with a hip joint link apparatus according to an embodiment of the present invention.
Figure 3:
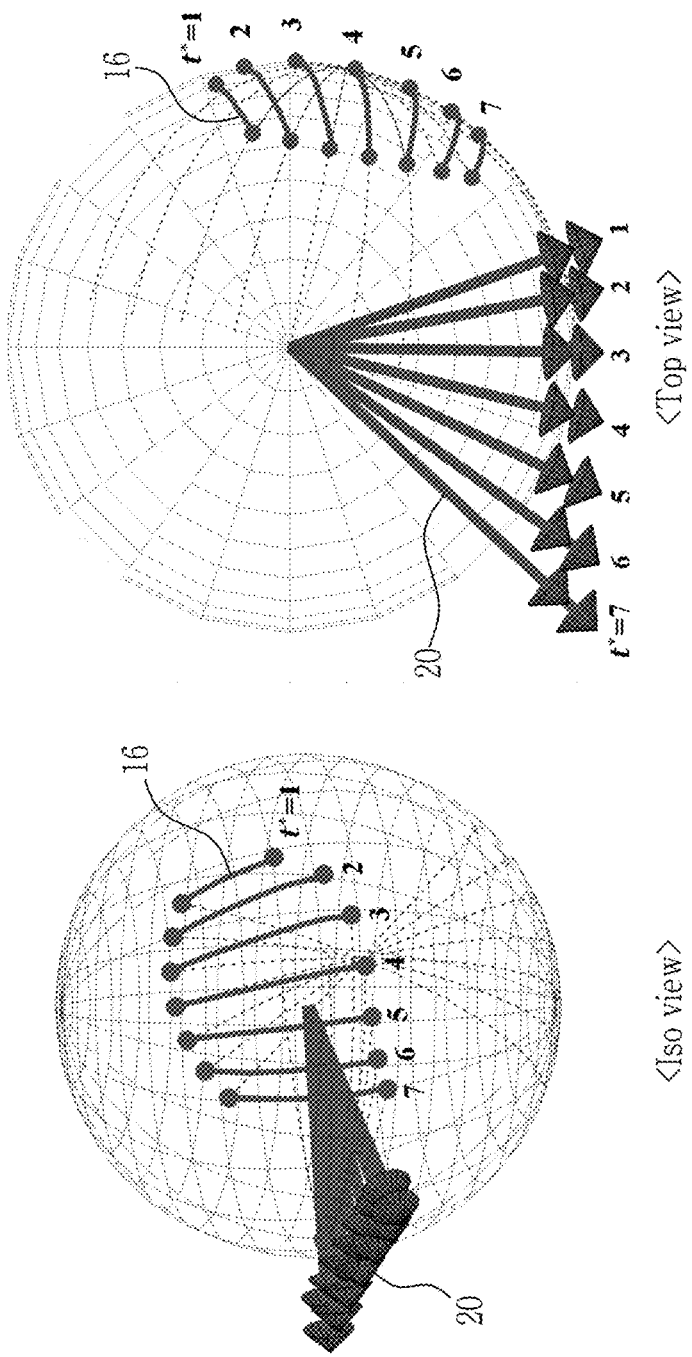
FIG. 3 is a drawing in which a sixth virtual link and output moments are accumulated when a thigh link linked to a thigh of a wearable robot has a gait motion.
Figure 4:
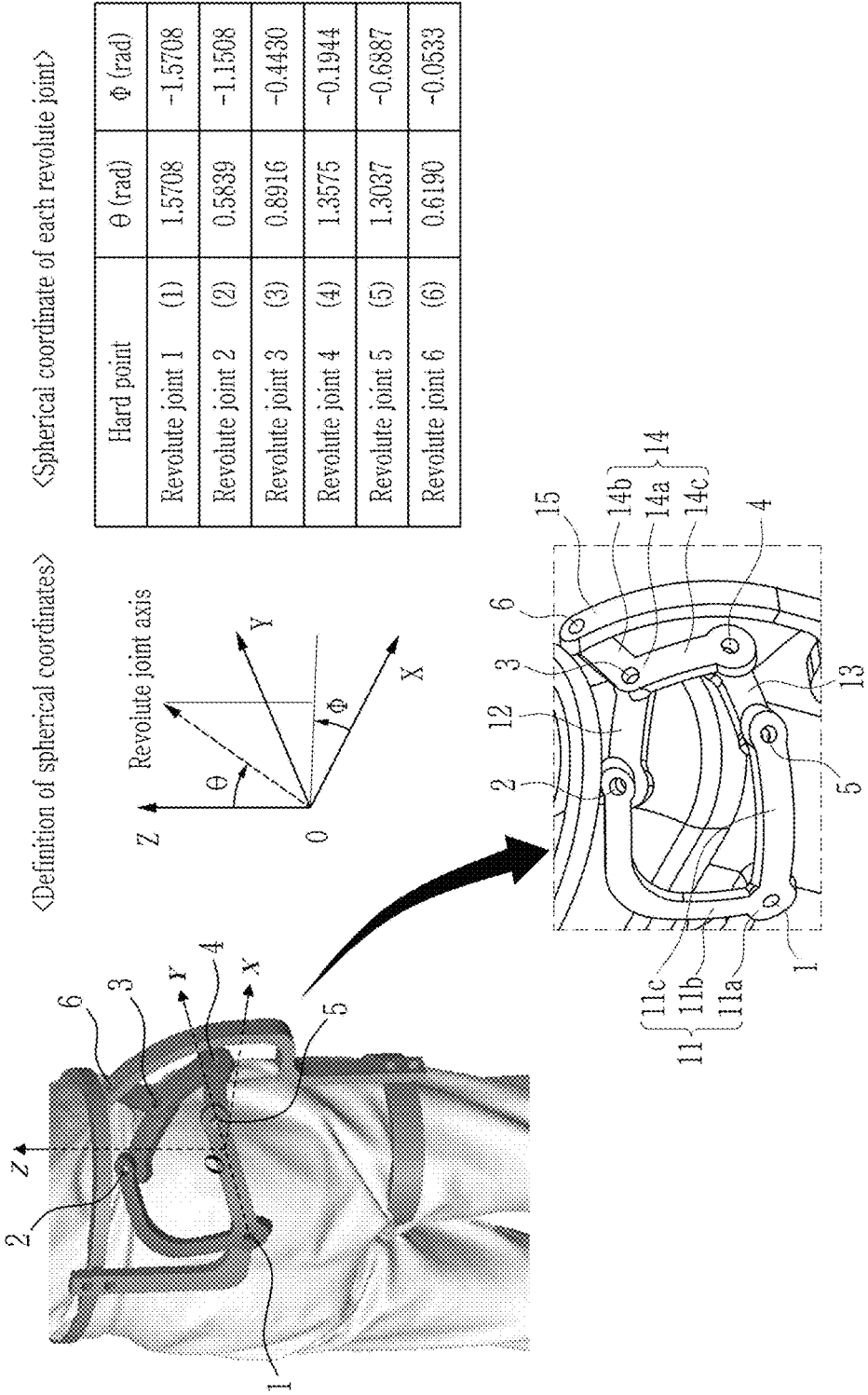
FIG. 4 illustrates dimensions of the hip joint link apparatus according to an embodiment of the present invention.

FIG. 1 illustrate a schematic view of a hip joint link apparatus according to an embodiment of the present invention, and FIG. 2 illustrates the same series link mechanism instantaneously in terms of a force transmission relationship with a hip joint link apparatus according to an embodiment of the present invention. FIG. 3 is a drawing in which a sixth virtual link and output moments are accumulated when a thigh link linked to a thigh of a wearable robot has a gait motion, and FIG. 4 illustrates dimensions of the hip joint link apparatus according to an embodiment of the present invention.

Referring to FIG. 1 to FIG. 4, a hip joint link apparatus according to an embodiment of the present invention includes a hip joint jointer linking an upper body link 10 fixed to an upper body of a wearable robot and a thigh link 15 linked to a thigh. In the hip joint jointer, a plurality of revolute joints and a plurality of links may be linked through a four-bar linkage mechanism. The hip joint part includes a plurality of revolute joints and a plurality of links linking the upper body link 10 fixed to the upper body of the wearable robot and the thigh link 15 linked to the thigh. In the hip joint jointer, a revolute joint and a link corresponding to each other may be linked to each other, so that a four-revolute joint link mechanism capable of changing an output moment direction may be implemented. For example, an arbitrary input moment is changed to an output moment in a predetermined direction based on a state in which the arbitrary input moment is transmitted to the plurality of links through the plurality of revolute joints, so that the hip joint jointer may assist the required flexion, extension, abduction, and adduction direction moments when the wearable robot walks.

Here, the plurality of revolute joints may include a first revolute joint 1, a second revolute joint 2, a third revolute joint 3, a fourth revolute joint 4, and a fifth revolute joint 5, sixth revolute joint 6.

The first revolute joint 1 may be linked to the upper body link 10 to function as a revolute axis of the input moment. The hip joint link apparatus according to the embodiment of the present invention includes at least one driving part, and the driving part may be linked to the first revolute joint 1. One side of the second revolute joint 2 may be interlocked to revolution of the first revolute joint 1. The third revolute joint 3 may be interlocked to revolution of the second revolute joint 2. The fourth revolute joint 4 may be interlocked to revolution of the third revolute joint 3. The fifth revolute joint 5 is provided at a position spaced apart from the second revolute joint 2 by a predetermined distance to be interlocked to the revolution of the first revolute joint 1 at the other side thereof. The sixth revolute joint 6 is linked to the thigh link 15, and may be interlocked to the revolution of the third revolute joint 3.

The plurality of links may include a first link 11, a second link 12, a third link 13, and a fourth link 14.

The first link 11 may be linked to the upper body link 10 through the first revolute joint 1. The first link 11 may include an eleventh coupling part 11a, a twelfth coupling part 11b, and a thirteenth coupling part 11c. The eleventh coupling part 11a is linked to a lower portion of the upper body link 10 to have a pivotable central support structure. An end portion of the twelfth coupling part 11b that is bent in a predetermined direction in the eleventh coupling part 11a to extend is linked to one side of the second link 12. An end portion of the thirteenth coupling part 11c that is spaced apart from the twelfth coupling part 11b by a predetermined distance at the eleventh coupling part 11a to extend in a direction of the third link 13 is linked to one side of the third link 13.

The second link 12 may be linked to the first link 11 through the second revolute joint 2. The third link 13 may be linked to the first link 11 through the fifth revolute joint 5. The fourth link 14 may be linked to the second link 12 through the third revolute joint 3, and may be linked to the third link 13 through the fourth revolute joint 4.

The fourth link 14 may include a forty-first coupling part 14a, a forty-second coupling part 14b, and a forty-third coupling part 14c.

The forty-first coupling part 14a has a pivotable central support structure, and is linked to the other side of the second link 12. An end portion of the forty-second coupling part 14b that extends in a predetermined direction from the forty-first coupling part 14a is linked to the upper portion of the thigh link 15. An end portion of the forty-third coupling part 14c that is formed to be spaced apart from the forty-second coupling part 14b by a predetermined distance from the forty-first coupling part 14a to extend in a direction of the third link 13 is linked to the other side of the third link 13. The thigh link 15 may be linked to the fourth link 14 through the sixth revolute joint 6.

As described above, the hip joint jointer includes the first revolute joint 1, the second revolute joint 2, the third revolute joint 3, the fourth revolute joint 4, the fifth revolute joint 5, the sixth revolute joint 6, the first link 11, the second link 12, the third link 13, and the fourth link 14, and accordingly, it may be applied to the hip joint link apparatus by implementing the four-bar linkage mechanism. When the four-bar linkage mechanism including the plurality of revolute joints and the plurality of links receives the input moment of the driving part by using the hip joint jointer according to the embodiment of the present invention, a direction thereof may be changed to the corresponding output moment. For example, a desirable momentum direction may be implemented by a serial connection structure between the four-bar linkage mechanism and the revolute joint.

FIG. 2 illustrates the same series link mechanism instantaneously in terms of a force transmission relationship with a hip joint link apparatus according to an embodiment of the present invention. A position of a virtual revolute joint 7 of a serial link mechanism at the right side of FIG. 2 is the same as a position of an instantaneous rotation axis 0 defined in a mechanism at the left side thereof. Here, the instantaneous rotation axis 0 means an instantaneous rotation axis of the fourth link 14 with respect to the first link 11. A sixth virtual link 16 is a virtual link that links the virtual revolute joint 7 and the sixth revolute joint 6. The moment inputted in the direction of the first revolute joint 1 through the driving part may be transmitted to the thigh link 15 as a moment having an axis in a direction perpendicular to the sixth virtual link 16 through the hip joint link apparatus.

FIG. 3 is a drawing in which the sixth virtual link 16 and output moments are accumulated when the thigh link 15 linked to the thigh of the wearable robot has a gait motion. Referring to FIG. 3, the sixth virtual link 16 is maintained in an almost vertical direction for all times (t*=1, 2, 3, 4, 5, 6, 7), and a longitude value of the sixth virtual link 16 may be changed. Accordingly, a direction of the output moment may be changed in a state in which a vertical direction component is not included. For example, the hip joint link apparatus proposed in the embodiment of the present invention may output a moment in a different direction according to a gait phase in a state in which there is no moment of a rotation component during the gait motion of the wearable robot. For example, a moment obtained by adding an extension moment and an abduction moment may be outputted in an initial stance. An abduction moment may be outputted in a mid stance. In addition, a moment of a sum of a flexion moment and an abduction moment may be outputted in a terminal stance.

FIG. 4 illustrates a link relationship and dimensions of the hip joint link apparatus according to an embodiment of the present invention. Referring to FIG. 4, it is possible to see an angle of a revolute joint axis using a spherical coordinate.

Figure 5:
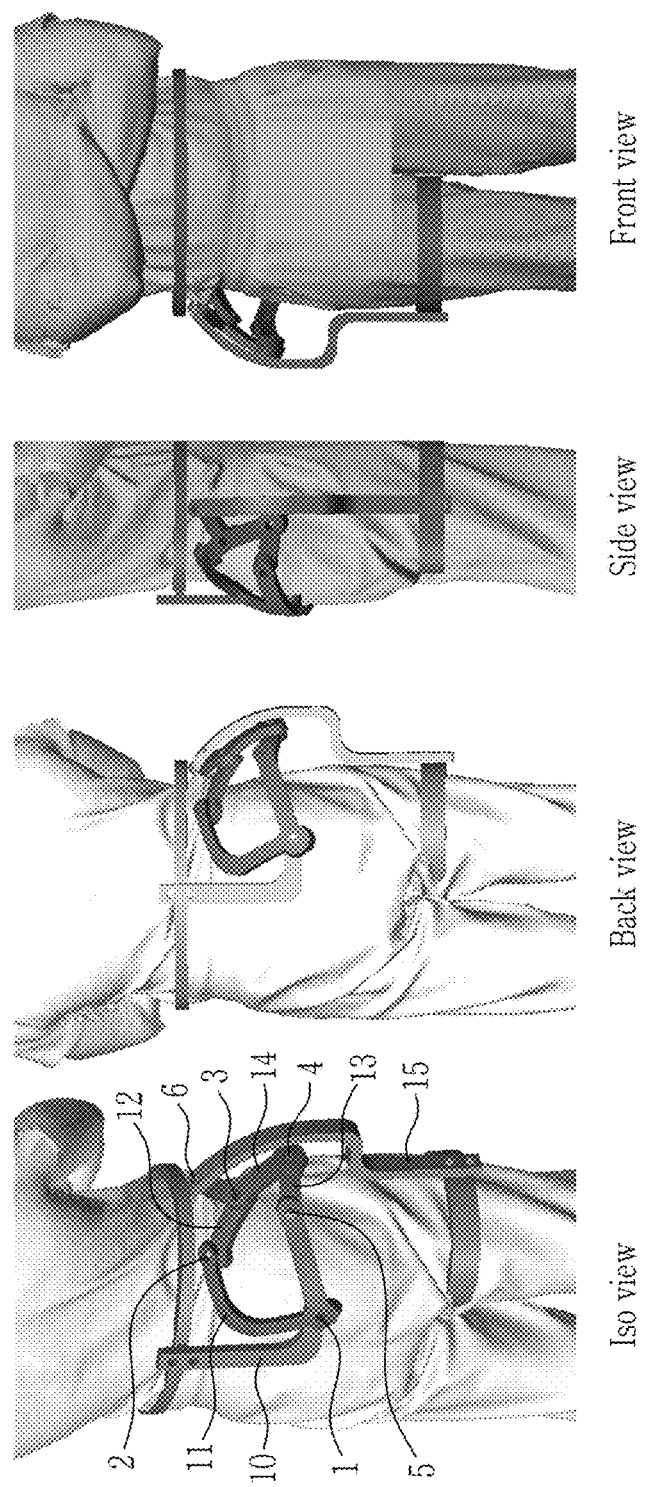
FIG. 5 illustrates various aspects of a user wearing a hip joint link apparatus according to an embodiment of the present invention.

FIG. 5 illustrates various aspects of a user wearing a hip joint link apparatus according to an embodiment of the present invention. FIG. 5 illustrates a state in which a user actually wears the hip joint link apparatus according to the embodiment of the present invention, and accordingly, the user may previously grasp the wearing state of the hip joint link apparatus.

Figure 7:
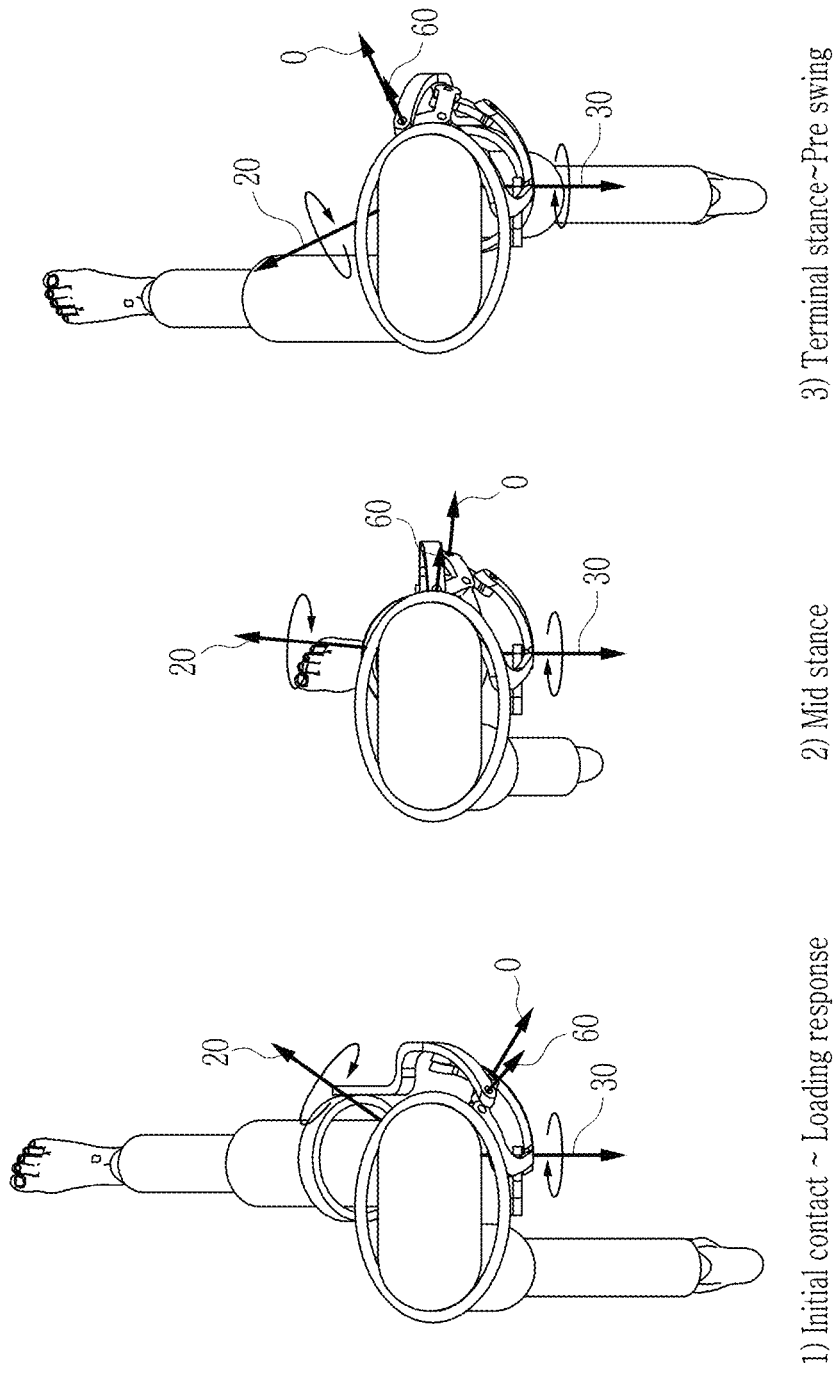
FIG. 7 illustrates a state viewed from the top of FIG. 6.

FIG. 6 illustrates a walking situation after a user wears a prototype of a hip joint link apparatus according to an embodiment of the present invention. FIG. 7 illustrates a state viewed from the top of FIG. 6. Referring to FIG. 6 and FIG. 7, it can be seen that the output moment direction is changed according to the leg position when the wearer with the wearable robot is walking.

Since the driving part is installed at the first revolute joint 1, an input moment axis 30 may be positioned at the rotation axis of the first revolute joint 1.

The rotation axis of the fourth link 14 with respect to the first link 11 is the instantaneous rotation axis 0. An output moment axis 20 may be in a vertical direction simultaneously to the instantaneous rotation axis 0, and a rotation axis 60 of the sixth revolute joint 6.

As the hip joint jointer moves during the gait phase, the positions of the instantaneous rotation axis 0 and the rotation axis 60 of the sixth revolute joint 6 are changed, and thus, the position of the output moment axis 20 is changed.

Figure 8:
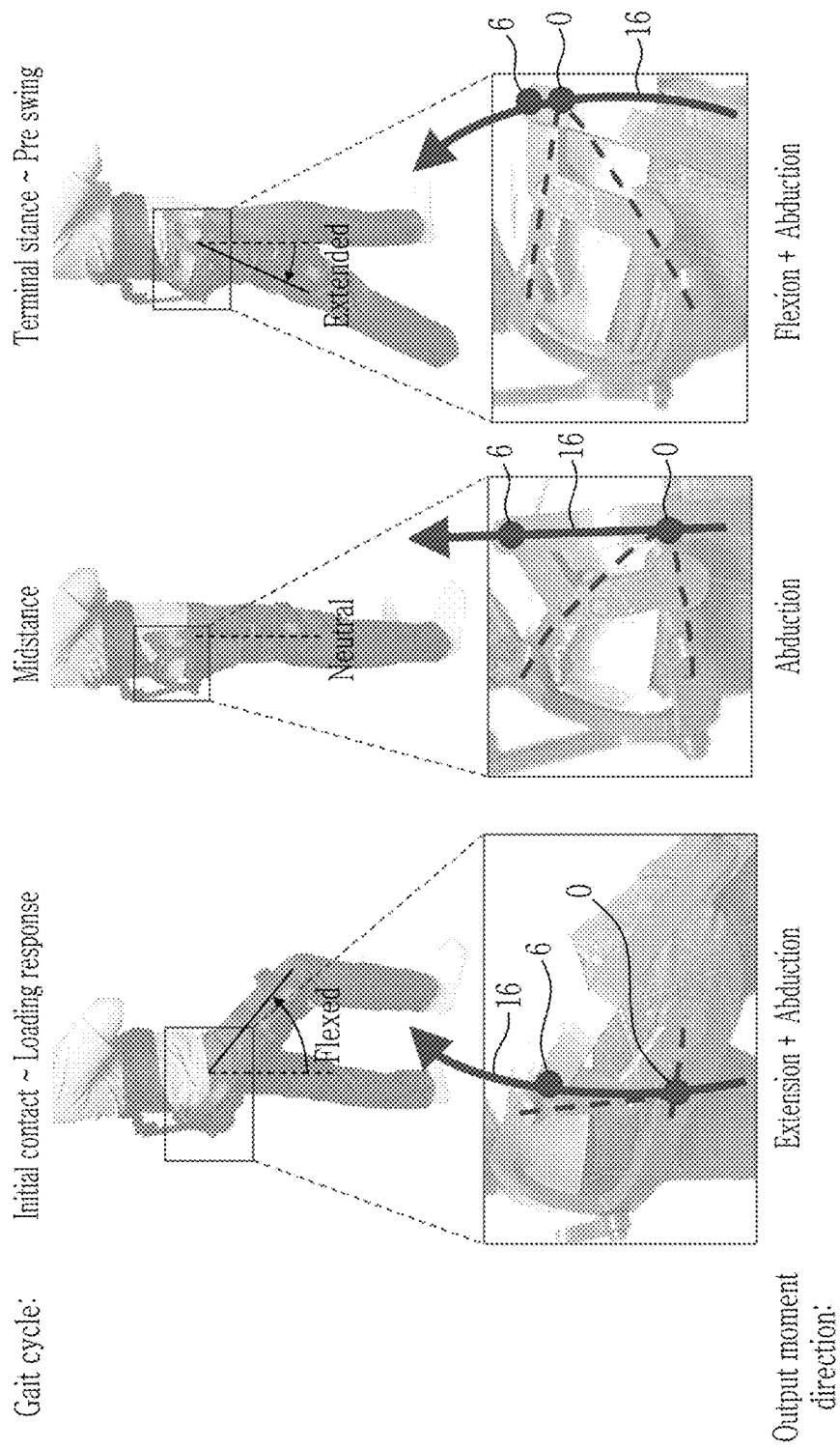
FIG. 8 illustrates a state in which a user wears a trial product of a hip joint link apparatus according to an embodiment of the present invention.

FIG. 8 illustrates a state in which a user wears a trial product of a hip joint link apparatus according to an embodiment of the present invention. Referring to FIG. 8, it can be seen that the output moment direction is changed according to the user's gait phase. As described above, the direction of "extension moment+abduction moment" is outputted in the initial stance of walking, the direction of abduction moment is outputted in the mid stance, and the direction of "flexion moment+abduction moment" is outputted in the terminal stance.

Figure 9:
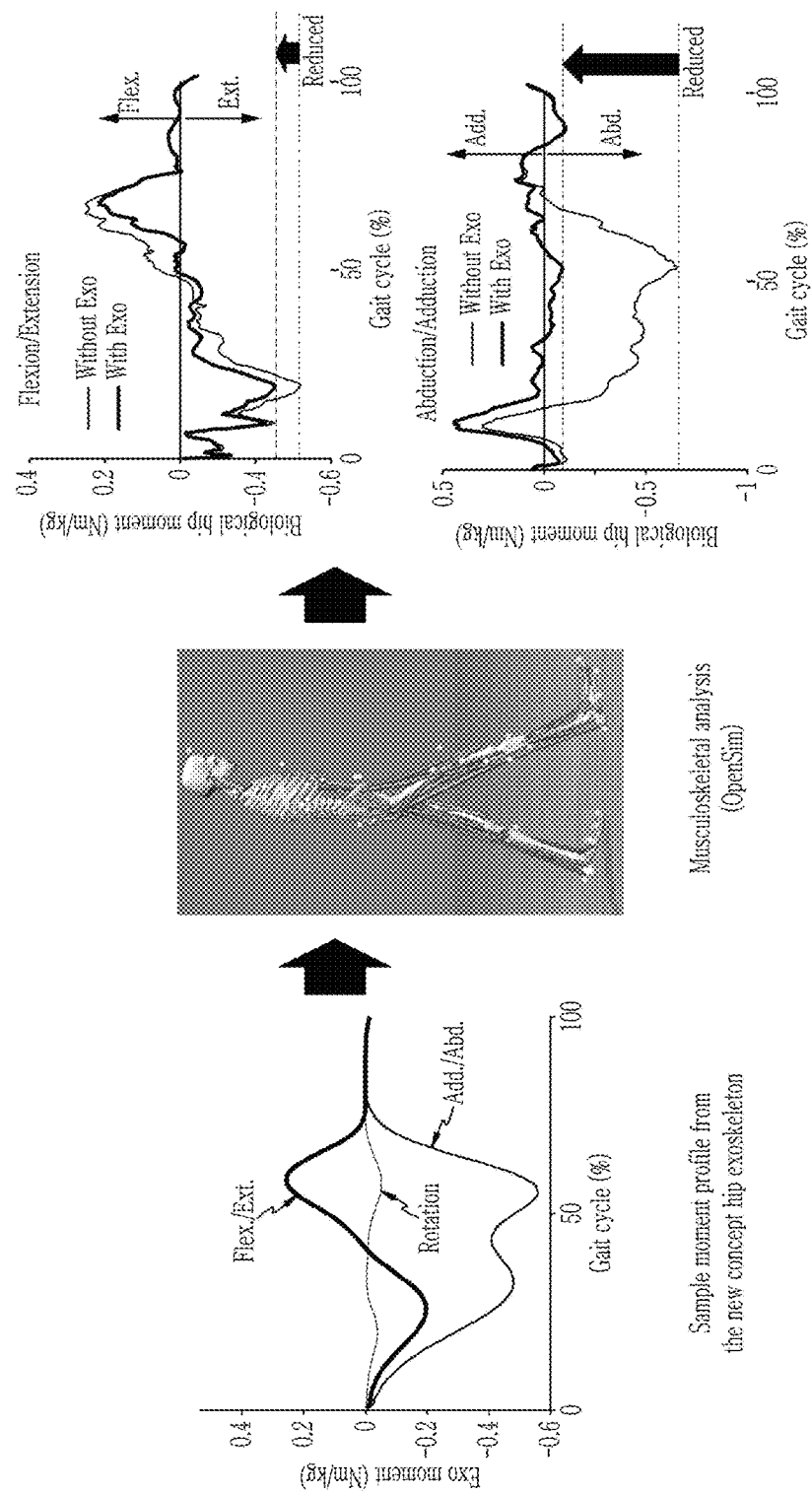
FIG. 9 illustrates a moment profile that is changed when a hip joint link apparatus according to an embodiment of the present invention is applied.

FIG. 9 illustrates a biological moment profile of a wearer that is changed when a hip joint link apparatus according to an embodiment of the present invention is applied. Referring to FIG. 9, when the driving part is applied to the first revolute joint 1, an example of the moment profile transmitted to the thigh of the wearable robot through the thigh link 15 is shown. When this moment assists the user wearing the hip joint link apparatus, the reduced moment may be grasped in advance.

When the moment profile of adduction (Add.)/abduction (Abd.) directions is given similar to the human body moment profile in the background art, the moment profile of flexion (Flex.)/extension (Ext.) and rotation, which are the other two directions, is also shown in a form similar to the human body moment profile in the background art. When the hip joint link apparatus according to the embodiment of the present invention is used, a three-dimensional moment profile required for gait may be outputted even though only one driving part is used. The hip joint link apparatus according to the embodiment of the present invention provides the feature that could not be realized in the design of any conventional hip joint link apparatus. Accordingly, when the outputted three-dimensional moment profile is applied to the human body, as shown in the right side of FIG. 9, it is possible to reduce both the flexion/extension direction moment and the adduction/abduction direction moment. This feature may be realized only when two or more driving parts are applied in a conventional hip mechanism design.

As described above, since the hip joint link apparatus according to the embodiment of the present invention includes a plurality of revolute joints and a plurality of links, productivity is good and maintenance is easy. In addition, since it is possible to realize the effect of using a plurality of driving units while reducing the number of driving parts, a more inexpensive wearable robot may be developed, and a commercially available time point of the wearable robot may be accelerated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hip joint link apparatus comprising:
an upper body link fixed to an upper body of a wearable robot, and a hip joint jointer linking a thigh link to a thigh of the wearable robot,
wherein the hip joint jointer has a four-revolute joint structure including a plurality of revolute joints and a plurality of links;
an arbitrary input moment to the hip joint jointer is changed to an output moment in a predetermined direction based on a state of being transmitted to the plurality of links through the plurality of revolute joints; and
the hip joint jointer assists a flexion moment, an extension moment, an abduction moment, and an adduction moment,
wherein the plurality of revolute joints include:
a first revolute joint that is linked to the upper body link and functions as a rotation axis of an input moment,
a second revolute joint that is interlocked at one side thereof to rotation of the first revolute joint,
a third revolute joint that is interlocked to rotation of the second revolute joint,
wherein the plurality of links include:
a first link linked to the upper body link through the first revolute joint, and
wherein the first revolute joint is linked to the middle portion of the first link, and the second revolute joint is linked to one end portion of the first link, and the third revolute joint is linked to the other end portion of the first link, and
wherein the first link includes a curved portion extended between the first revolute joint and the second revolute joint in a plan view, and a length of the curved portion is longer than a distance between the first revolute joint and the second revolute joint.

2. The hip joint link apparatus of claim 1, wherein the plurality of revolute joints include:
a fourth revolute joint that is interlocked to rotation of the third revolute joint,
a fifth revolute joint that is provided at a position spaced apart from the second revolute joint by a predetermined distance and is interlocked at the other side thereof to rotation of the first revolute joint, and
a sixth revolute joint that is linked to the thigh link and is interlocked to rotation of the third revolute joint.

3. The hip joint link apparatus of claim 2, wherein the plurality of links include:
a second link linked to the first link through the second revolute joint,
a third link linked to the first link through the fifth revolute joint, and
a fourth link linked to the second link through the third revolute joint and linked to the third link through the fourth revolute joint.

4. The hip joint link apparatus of claim 3, wherein the thigh link is linked to the fourth link through the sixth revolute joint.

5. The hip joint link apparatus of claim 3, wherein the first link includes
an first coupling part that is linked to a lower portion of the upper body link to have a pivotable central support structure,
a second coupling part wherein an end portion thereof that is bent from the first coupling part in a predetermined direction to extend is linked to one side of the second link, and
a third coupling part wherein an end portion thereof that is spaced apart from the second coupling part from the first coupling part is linked to one side of the third link.

6. The hip joint link apparatus of claim 5, wherein the fourth link includes
a fourth coupling part that has a pivotable central support structure and is linked to the other side of the second link,
a fifth coupling part wherein an end portion thereof extending in a predetermined direction from the fourth coupling part is linked to an upper portion of the thigh link, and
a sixth coupling part wherein an end portion thereof that is spaced apart from the fifth coupling part from the fourth coupling part by a predetermined distance to extend in a direction of the third link is linked to the other of the third link.

7. The hip joint link apparatus of claim 2, further comprising
at least one driving part,
wherein the driving part is linked to the first revolute joint.

* * * * *